T. J. CHUBB.
Ore Furnace.

Patented Aug. 6, 1867.

Witnesses:
R. T. Campbell
Edw. Schafer

Inventor:
Thos. J. Chubb
by his attys
Mason, Fenwick & Lawrence

T. J. Chubb.
Furnace.
N° 67497. Patented Aug 6. 1867.
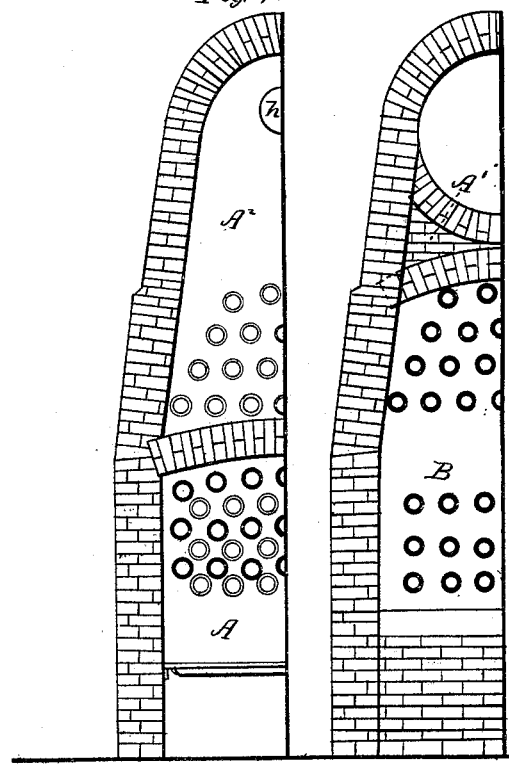
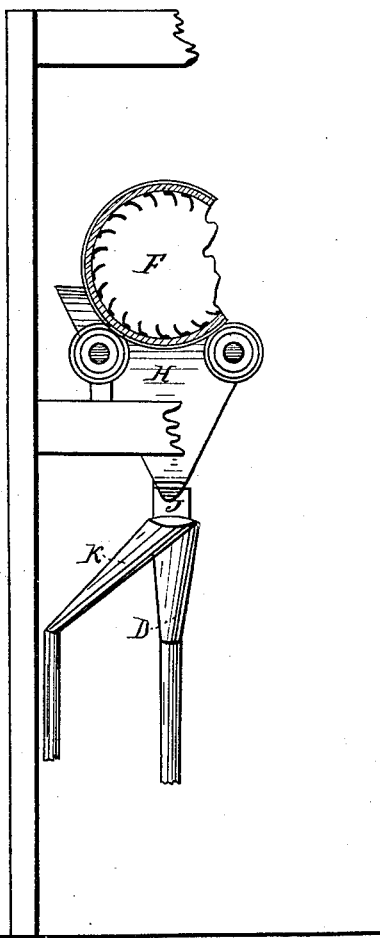
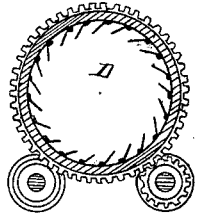
Witnesses:
Inventor:

United States Patent Office.

THOMAS J. CHUBB, OF BROOKLYN, NEW YORK.

Letters Patent No. 67,497, dated August 6, 1867.

IMPROVED FURNACE FOR OXIDIZING ORES.

*The Schedule referred to in these Letters Patent and making part of the same*

TO ALL WHOM IT MAY CONCERN:

Be it known that I, THOMAS J. CHUBB, of Brooklyn, in the county of Kings, and State of New York, have invented a new and improved Oxidizing Furnace; and I do hereby declare that the following is a full, clear, and exact description thereof, reference being had to the accompanying drawings, making a part of this specification, in which—

Figure 2 is a plan view.

Figure 3 is a vertical transverse section, taken in the line $o\ o$.

Figure 4 is a vertical transverse section, taken through half the furnace at the line P.

Figure 5 is a vertical transverse section, taken at the line R.

Figure 6 is a transverse section through the revolving cylinder.

Similar letters of reference indicate corresponding parts in the several figures.

Figure 1:
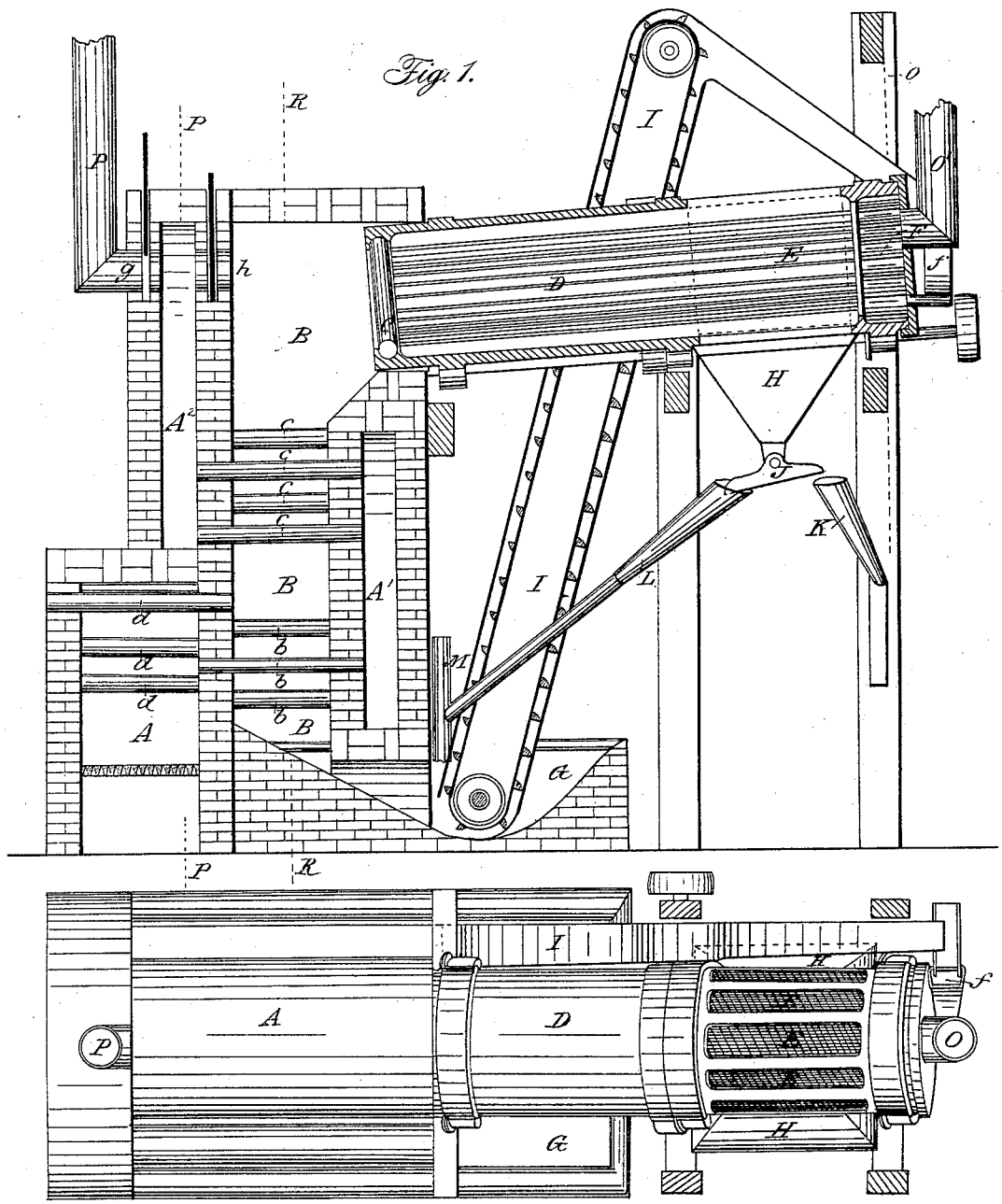
Figure 1 is a longitudinal section, taken in a vertical plane through the centre of the furnace.

This invention relates to a mode of carrying out the process of separating volatile and other substances associated with precious metals, which process was set forth by me in a caveat filed in the confidential archives of the Patent Office on the 29th day of June, 1854.

The apparatus, which will be hereinafter described, may be used for treating "tailing" sands, or for the ore as it comes from the mine; drying, disintegrating, decomposing, and oxidizing arsenicated, sulphuretted, or other ores, changing the baser metals into oxides, peroxides, or tritoxides, and condensing the fumes, vapors, or gases of or from mercury, so as to extract or assist in extracting the precious metals from substances with which they are found associated.

The apparatus which forms the subject of this application is intended more particularly for heating, cooling, reheating and recooling, and thus oxidizing the baser substances mixed with precious metals, previously to subjecting the ore to a further separation or treatment, as will be hereinafter described.

To enable others skilled in the art to understand my invention, I will describe its construction and operation.

In the accompanying drawings, A represents a wood-burning furnace. $A^1$ is a back connecting-chamber, communicating with the furnace-chamber by means of pipes $b\ b\ b$, and communicating with the receiving-chamber $A^2$ above the furnace by means of an upper series of pipes, $c\ c\ c$. The products of combustion escape from the chamber $A^2$ through a pipe or chimney, P, shown in figs. 1 and 2. B is an ore-heating chamber, wherein atmospheric air is heated that enters this chamber through the pipes $d\ d$ in the upper portion of the furnace A. C is an iron ball for breaking up soft lumps of ore, and D is a revolving cylinder with longitudinal shelves or buckets arranged within it. E is a revolving screen, and F is a series of revolving buckets for carrying up water and letting it fall in a shower. G is a hopper and water or acid-tank, and H is a drip-funnel or open-mouth trough, which latter is arranged beneath the screen E. I is an elevator. J is a tipping-trough or spout, and K is a trough or pipe leading to the amalgamator. The pipe or trough L is for bringing back the condensed water or liquid that passes through screen E. M is a clean-water pipe leading into the hopper G, and O is a pipe which is connected to a high chimney for conducting off the exhausted air, &c., and to form a current of fresh air through the oxidizing-chamber B and cylinder D E F. P is a chimney or pipe leading to the main chimney, for carrying off the gases from the furnace A. The dampers $g$ and $h$ are used for regulating the draught and escape of spent gases from the furnace-chambers.

The operation of the apparatus is as follows: Fire is made on the grate-bars in furnace A; the flame, smoke, and gasses pass upward around pipes $d\ d\ d$, and through pipes $b\ b\ b$ into the chamber $A^1$; thence into and through pipes $c\ c\ c$, and into chamber $A^2$, from which latter the products of combustion are allowed to escape, as desired, through the valve-openings $g$ and $h$ into the main flue or escape pipe. When the furnace B becomes sufficiently hot the cylinder D E F and the elevator I are set in motion. The hopper G is partially filled with water or other liquid, and the ore fed into it, which water and ore are carried up in suitable quantities by the elevator I, and deposited into the cylinder above mentioned. The water and ore rise and fall in the compartment F, then escape on the cylindrical screen E, where the water or liquid portion is drawn off and returned to the hopper G. The ore moves on and passes into the close cylindrical portion D, where it continues to rise and fall till it comes beneath the ball C. This ball breaks up and pulverizes the soft lumps of ore, and the ore falls from the cylinder around, against, and between the pipes $c$ and $b$, to the bottom of the chamber B, from which the ore escapes into the bath in the hopper G again. The ore and liquid are again elevated and conducted through the revolving cylinder, and this process may be repeated again and again, until the ore is sufficiently disintegrated, decomposed, desulphurized, and oxidized, when it may be drawn off either in a dry or wet state. If it is desirable to draw off the ore in a dry condition, the tipper J is inclined so as to allow no more water to run into the hopper G. If required wet, the elevator-trough is changed to convey the ore away. In treating sulphuretted ores the water in box or hopper G will become highly charged with sulphur, and this is the case in treating all kinds of ores, the water will become highly charged by its condensing the vapors. Should the pyroligneous acid be required from the products of combustion, the damper $g$ is closed and damper $h$ opened, and considerable smoke made in the furnace A. This smoke will then rise and escape into the treating-chambers and be condensed by the water or wet ore.

Having thus described my invention, what I claim as new, and desire to secure by Letters Patent, is—

1. The combination of a revolving cylinder, which is provided with elevating strips or buckets, with a furnace which is constructed with a receptacle for receiving the ore from said cylinder, substantially as described.

2. The construction of the cylinder D, with a contrivance for grinding or crushing the ore as it flows therefrom, substantially as described.

3. The combination of cylinders E D E, substantially as described.

4. The receiving-hopper G, and furnace-chamber B, with an elevator, I, and a revolving cylinder, in combination with a suitable furnace, all arranged so as to operate substantially as described.

5. The construction of the furnace for heating the ore, of a fire-chamber, A, flues $b$ $c$ $d$, chambers $A^1$ $A^2$ and B, and damper openings $g$ $h$, substantially as described.

6. Providing for conducting the products of combustion into or through the ore-treating chambers, or directly off through pipe P, at pleasure, substantially as described.

7. Inclining the cylinder D toward the furnace, so as to effect the return of the ore after each treatment to the receiving-hopper G, substantially as described.

8. The receiver H, in combination with a cylindrical screen, E, substantially as described.

9. The tilting trough J, in combination with a return-spout, L, leading down to the receiver G, substantially as described.

10. The arrangement of a series of disconnected pipes, $c$ $c$, $d$ $d$, $b$ $b$, with relation to the furnace-chamber A, hot-air chamber B, substantially as and for the purpose described.

11. So constructing an apparatus for treating ore, substantially as described, that the operation or treatment can be repeated as often as desired without handling the ore, substantially as described.

THOS. J. CHUBB.

Witnesses:
DAVID B. PHILLIPS,
W. E. VAN GICKLEN.